United States Patent [19]

Chisholm

[11] 4,283,725
[45] Aug. 11, 1981

[54] IN-FLIGHT AIRCRAFT WEATHER RADAR CALIBRATION

[76] Inventor: John P. Chisholm, P.O. Box 2122, Olympic Valley, Calif. 95730

[21] Appl. No.: 82,512

[22] Filed: Oct. 9, 1979

[51] Int. Cl.³ .......................... G01S 13/95; G01S 7/40
[52] U.S. Cl. .................................... 343/5 W; 343/17.7
[58] Field of Search .............................. 343/5 W, 17.7

[56] References Cited

U.S. PATENT DOCUMENTS

| | | | |
|---|---|---|---|
| 2,942,257 | 6/1960 | Huntington | 343/17.7 |
| 3,108,275 | 10/1963 | Chisholm . | |
| 3,243,816 | 3/1966 | Chisholm . | |
| 3,716,855 | 2/1973 | Asam . | |
| 3,729,737 | 4/1973 | Asam . | |
| 3,745,579 | 7/1973 | Lott . | |
| 3,775,766 | 11/1973 | Gendreu | 343/5 W X |
| 3,787,841 | 1/1974 | Beuhler et al. | 343/5 W X |
| 3,792,475 | 2/1974 | Smetana . | |
| 3,832,712 | 8/1974 | Goetz et al. . | |
| 4,005,424 | 1/1977 | Fetter . | |
| 4,104,634 | 8/1978 | Gillard et al. . | |

Primary Examiner—T. H. Tubbesing
Attorney, Agent, or Firm—Dowell & Dowell

[57] ABSTRACT

A weather radar calibration system, wherein one or more radar reflectors are located at a known position adjacent to an airport runway. Each of the reflectors are shaped to direct reflective patterns of known radar cross-section in response to radar signals transmitted from an aircraft following a known guidance path to the airport. The aircraft radar detects the radar return signals from the reflectors. Circuitry is responsive thereto for utilizing the radar returns for calibrating the weather radar for precipitation measurement and display purposes. The design of the reflectors is such as to minimize multipath reflections off the ground and prevent them from disturbing the reflective properties for aircraft following the guidance path.

13 Claims, 4 Drawing Figures

IN-FLIGHT AIRCRAFT WEATHER RADAR CALIBRATION

FIELD OF INVENTION

This invention relates to airborne weather radar systems and, more particularly, relates to a method and apparatus for the calibration of such weather radars with respect to their ability to accurately measure and display rain intensity.

BACKGROUND AND PRIOR ART

An important factor in the safety of flight is the use of airborne weather radars for the detection and avoidance of regions of heavy precipitation, since: (1) they can be associated with turbulence and/or airflows that can be dangerous to the aircraft; and (2) the precipitation itself can be of sufficient magnitude to cause failures, such as engine flameout. Currently, airborne weather radars do not consistently measure precipitation intensity with a high degree of accuracy. Specifically, in a large population of aircraft, it is believed that a significant number of the airborne weather radars will overestimate or underestimate precipitation by as much as ten to one. This means that, in such cases, light precipitation will sometimes be displayed as dangerously heavy when it is not, and heavy precipitation will sometimes be displayed as light and not potentially dangerous when in fact it is dangerous. Such a calibration error is recognized as having contributed to some recent airlines crashes wherein very heavy precipitation apparently was not properly detected and displayed by the airborne weather radar.

This incorrect estimation of precipitation will occur because of the inadequacies of current practices for periodically calibrating airborne weather radars for precipitation intensity measurement purposes. In operation, a weather radar estimates precipitation by first measuring the "radar cross-section" of the precipitation and then converting this cross-section measurement to precipitation by an equation based on an assumed droplet size distribution of the rainfall, and a knowledge of the radar wavelength, pulse length and beam width. The equation itself is not considered to be a substantial source of error in determining and displaying precipitation according to this disclosure.

There are two basic techniques for calibrating a radar system for the purpose of measuring radar cross-section whether the radar is a weather radar or a general purpose radar designed to measure radar cross-section for purposes of determining the radar cross-section of a military or civil aircraft or other target.

The first basic technique, and the one used in current airborne weather radar practice, is to calculate or measure, all the individual radar parameters such as antenna gain, power output, receiver sensitivity, waveguide losses, etc., and to insert such parameters in an equation that relates a measured echo at a measured distance to the equivalent radar cross-section of the target generating the echo at that distance. The difficulty with this practice is that an accurate measurement of radar cross-sections requires, at the time of the measurement, an accurate knowledge of all the above parameters. In practice, of course, this is not possible because earlier-made measurements of power output, receiver sensitivity, etc. are assumed to be stable since the last measurement, which may no longer be true since these parameters change with time. For instance, waveguides can become corroded and produce losses that can significantly affect the cross-section measurement, and there are many other cumulative losses which are not readily detected by periodic conventional calibration procedures. By this technique it is very difficult, using routine calibration procedures, to obtain any absolute radar calibration to within ±3 db, and this calibration can easily vary by up to ±10 db in a large population of aircraft, even with frequent calibration procedures, since such procedures do not cover all possible sources of error such as waveguide losses. A 10 db error in calibration can generate a 10:1 error in precipitation intensity estimation.

The second basic technique is often used for calibrating ground based radars on an absolute basis to provide accurate measurement of radar cross-section. It usually involves a ground based radar observing a point target of known radar cross-section at a known distance. The radar indication is then calibrated directly in terms of radar cross-section. In this procedure, it is not necessary to individually calculate or measure parameters such as power output, receiver sensitivity, waveguide losses, etc., since such parameters are not needed for the calibration procedure. In order to use this initial calibration to further calibrate the radar for targets of different cross-sections appearing at different ranges it is only necessary to know the relationship of receiver signal output to echo intensity input and to apply a correction for range. This absolute calibration procedure is typically implemented for ground based radars by the use of a metallic sphere suspended from a balloon. "Calibration of a Weather Radar Using a Standard Target" Atlas & Massag. Bulletin of the American Meteorological Society, Vol. 41, No. 7 July 1960. A metallic sphere has a radar cross-section that is independent of its viewing angle and is essentially equal to its projected area. It is usually suspended from a balloon so that it will provide a readily identifiable echo isolated from ground clutter targets. The reflector, can however, in certain applications be mounted on the ground and coded, or identified, by some means to distinguish it from ground clutter targets. Such coding or identifying techniques can be by mechanical modulation of the reflector or by electrical modulation as in my Frequency Shift Reflector U.S. Pat. No. 3,108,275. While the above procedure for direct calibration is conceptually quite simple, one problem that presents itself during in-flight calibration is that, as a practical matter the "calibration" target must be located on the ground in a known region. It is thus in the midst of "ground clutter" targets and hence tends to be obscured by such targets except under unique conditions. Moreover such targets add to or subtract from its known radar cross-section, thus invalidating the intensity calibration. A potential way around this problem is to make the calibration target sufficiently large in radar cross-section so that it greatly exceeds normal ground clutter targets. Statistically, a large specular target of 10,000 square meters (40 dbsm) will be experienced once per square mile of urban area at low viewing angles. One must therefore expect that an aircraft making a 3 degree approach to an airport will probably see one such large target at the airport. "Specular" clutter is clutter typically associated with man-made structures, in contrast to distributed clutter which is generally associated with rocks, trees, and terrain irregularities. Distributed clutter is two to three orders of magnitude below the 10,000 square meter clutter discussed herein, and hence is not a problem. The concept of providing large radar targets on an airfield that will stand out above ground clutter is, of course, extensively investigated in the prior art.

One solution is to provide ground based reflectors tilted at useful angles with respect to a guidance path as shown in my U.S. Pat. No. 3,243,816 in which I teach the art of using ground based reflectors in order to provide vertical guidance to landing aircraft cooperatively with an airborne radar, such as a weather radar. In that patent, I did not recognize the difficulty caused by the multipath reflections off the ground perturbing the reflective properties of the reflectors and causing rapidly alternating signal enhancements and cancellations which are of such character as to make reflectors periodically disappear completely from the radar display. Such reflective perturbations would of course destroy the value of a reflector for calibration purposes. Similarly, many efforts have been made to use reflectors spaced along a runway to outline the runway merely for purposes of horizontal guidance. Programs, such as the Bendix Microvision program, and other current tests by the FAA for purposes of helicopter navigation, have confirmed that the reflective patterns so obtained are unstable in that the reflectors appear and disappear as the aircraft approaches touchdown. This phenomenon is undoubtedly due to multipath effects as noted herein.

Subsequent to the issuance of my U.S. Pat. No. 3,243,816 (supra) U.S. Pat. Nos. 3,716,855 and 3,729,737 to Asam have taught the use of multiple reflectors along the runway for range tracking and for vertical guidance, without recognizing the need for protecting the reflective properties of such reflectors from the effects of multipath.

U.S. Pat. No. 4,104,634 to Gillard et al does seek to solve the multipath problem experienced by dihedral corner reflectors used near the ground, by tilting the reflectors normal to the ground so that no spurious multipath problem is possible since all useful signals must be ground reflected. A very significant difficulty with this technique is that the ground surface must be made flat and of consistent and significant reflecting projection at radar frequencies over very large areas. This tends to be impractical in changing meteorological conditions i.e. snow, ice, rain, etc. Current low frequency (300 MHz) ILS vertical guidance beams experience this difficulty when their design is such as to use a reflection off the ground for beam formation purposes. More modern low and high frequency ILS vertical guidance systems use highly directional antennas seeking to eliminate such multiple reflections as a source of guidance error.

THE INVENTION

The invention provides a method and apparatus for automatically calibrating an airborne weather radar so that during the continuing flight of the aircraft it will accurately display an indication of rain intensity, which represents a distributed target response, even though the weather radar during its calibration is being calibrated using echo responses from a point source comprising the calibration targets provided for this purpose along the guided approach path. The apparatus includes easily radar acquired and identified ground supported reflectors having a large radar cross-section and providing reflections which are substantially free of multipath signal cancellation and enhancement effects, whereby the reflectors are stable targets, taken in combination with airborne range determining means, encodement decoders to identify the reflectors, and means for calibrating the gain of the receiver for a point target of known radar cross-section at a known range, and also for translating this point-target response into a calibration of radar cross section per unit volume for a distributed type of target corresponding in character with reflections from a precipitation type of target. This calibration method and apparatus are done during an approach along an accurately guided path so that the isolation of the reflectors from other ground clutter can be achieved. The reflectors can be either exclusively provided for such calibration purpose, or alternatively they may be part of a guidance array, for instance as taught in the above Asam patents or other similar patents, so long as the calibration reflectors can be separately identified and employed for calibration purposes and are stable and of known radar cross-section within the employed guidance limits of the guidance path.

OBJECTS AND ADVANTAGES OF THE INVENTION

It is therefore a primary object of the invention to provide a procedure for the absolute calibration of airborne weather radars in terms of radar cross-section on a frequent basis, preferably at least once a day while in-flight. The term "absolute" refers to calibrating the radar directly in terms of radar cross-section, rather than indirectly by measurements of the separate radar parameters, and then combining these measurements in the radar equation. Therefore, it is necessary to place calibrating targets of large, stable and known radar cross-section, in locations at airports where they can be distinguished from other ground clutter targets, and which are easily identified by the weather radar in an aircraft while making an approach to the airport.

It is a major object of this invention to locate calibration targets in carefully selected places so that they can be precisely located with respect to an aircraft, when the aircraft is making a precision approach along a guidance path, such as an ILS guidance path. A preferred location is adjacent to the runway at the ILS touchdown point. Moreover, it is necessary to place a reflector thereat which has sufficient magnitude so that it will be readily identifiable from clutter targets in its vicinity, and also so that local clutter echoes which will add to and subtract from the intensity of reflections as the flight path geometry changes will not perturb the calibration beyond acceptable limits. A target of large radar cross-section can be achieved, for example, by the use of a very large metallic sphere, which exhibits the same cross-section in all directions. A much more practical technique is to use a target that provides "gain" in a preferred direction, which gain increases its observed radar cross-section. For such a spherical target to exceed anticipated ground clutter targets of 10,000 square meters, the sphere would have to be about 100 meters across, which is of course impractical. A smaller physical reflector with "reflective" gain is thus desirable, for example, a circular flat plate which has a radar cross-section equal to its projected area multiplied by its gain as an "antenna". At x-band, a circular flat plate with an area of 1 square meter has a gain of $G = (4\pi A)/\lambda^2 = 10,000$, where $A$ = one square meter and $\lambda = 0.03$ meters, in its preferred direction along an axis perpendicular to the flat plate. Its radar cross-section along that axis is thus equal to $A \times G = 10^4$ square meters. The difficulty with this method of obtaining such a large radar cross-section is that such a large cross-section is only obtained within a very limited angle. Specifically, for the above noted case, the reflectivity drops off by about 6 db outside of approximately ±1.2° about the axis. Such narrow angular coverage implies that the aircraft viewing this target must be quite closely aligned with the reflector axis in two dimensions. This is possible but it can pose practical guidance problems for an aircraft during the calibration process. In order to overcome this angular limitation, a dihedral corner reflector target, oriented to provide wide azimuth coverage and limited vertical coverage, can be utilized. Such a reflector will provide a radar cross-section equal to its projected area multiplied by a gain corresponding to that projected area over a wider azimuth angle, typically at least ±10°. When using such dihedral reflectors the aircraft need only be aligned relatively accurately in the vertical, which is the critical ILS approach angle and hence is maintained very precisely in normal flight into an airport. Other types of reflectors having similar performance, such as a Luneberg lens reflector can be used. The pattern of a Luneberg lens reflector is discussed in my U.S. Pat. No. 3,158,862.

In addition since the azimuth angular coverage of the dihedral reflector is not affected by its horizontal dimensions the vertical dimension can be decreased to increase the angular vertical reflectivity beam coverage for vertical guidance limits purposes, while still maintaining an over-all desired radar cross-section, by increasing horizontal dimensions. The vertical dimension however must still be adequate to minimize multipath reflections as noted later.

It is another major object of this invention to provide a target of stable and known cross-section which will be independent of multipath, and which will provide echoes of intensity which are controlled by the design of the reflector within a viewing angle coincident with an aircraft approach guidance path for the purpose of providing a method for accurately calibrating a weather radar in terms of measured radar cross-section. Therefore, attention must be paid to the multipath problem in terms of ensuring that the reflectors utilized will reject multipath signals off the ground to an extent necessary to permit the radar cross-section of the reflectors as measured by the returning signal to stay within desired tolerances. In order for such reflectors to provide a stable reflection pattern that will permit the pilot to view their display with confidence, it is necessary to provide a sharp reflector cutoff in the lower vertical reflectivity pattern. When the reflector is used to provide a calibration target and is located at the terminus of a 3° glideslope, then this desired cutoff can be obtained by the use of one or more dihedral reflections with vertical dimensions of the order of a few feet. The horizontal dimensions of the reflector can be independently adjusted, to permit the required radar cross-section, without influencing the desired vertical cutoff. The desired reflector, in dihedral configuration, is thus a very simple and practical device.

As a further technique to provide uniform reflectivity over the vertical guidance limits, multiple reflectors can be used with small separations along the guidance path to provide identification encoding, these reflections can be tilted at somewhat different angles to the vertical so that their lobes tend to partially overlap. With proper overlap, their lobes may be made to augment each other so that, viewed together, their echoes can be added at the receiver output to provide a composite broader uniform lobe when viewed in vertical cross-section. The reflectors would have to be spaced apart along the runway by at least a pulse length in order to prevent the return from two or more reflectors adding or subtracting prior to entering the radar receiver, i.e. scintillating as the geometry changes. The reflectors could all be aligned with the guidance path, or one along the path with one slightly above and one slightly below, to provide a more uniform averaging process as the aircraft deviates above and below the guidance path in normal approach flight. Such use of multiple reflectors arranged in a known, or coded, arrangement greatly enhances the ability to isolate such reflector echoes from randomly distributed ground clutter. Single reflectors, suitably coded either mechanically or electrically to distinguish them from ground clutter can also be utilized, but this tends not to be as practical an identification method as multiple reflectors spaced (coded) in range.

A single non-coded reflector can also be used where ground clutter is minimal, as at isolated airfields in remote areas in a desert or in the Arctic.

It is also possible to use airborne computer processing of the data from single or multiple reflectors to minimize potentially large errors due to undesired clutter echoes that might momentarily arise from a large aircraft taxiing by such a reflector, for example. Specifically, for example, as the flight progressed along the guidance path, uniform calibration data should be obtained from all such reflectors as a function of time and range. If a significant and momentary change in such calibration data were measured, as for example in one reflector out of several at one time, or one reflector as a momentary function of time, such data could be discarded, or averaged out, by the onboard microcomputer for calibration purposes.

PREFERRED EMBODIMENTS

Figure 1:
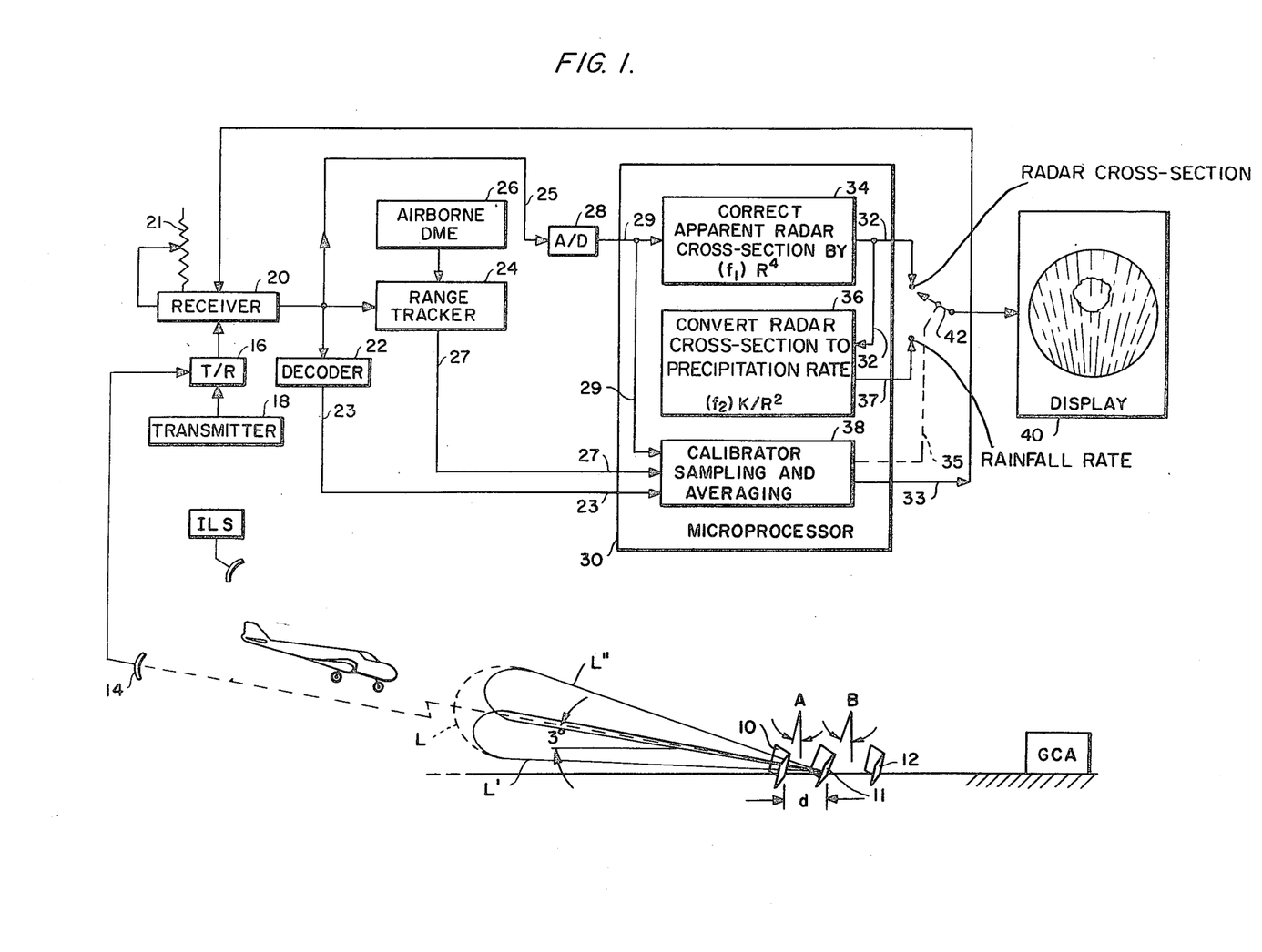
FIG. 1 is a block diagram of a system according to this invention showing apparatus aboard an aircraft approaching coded ground reflectors on a landing strip.

Referring now to FIG. 1, this figure shows an aircraft approaching touchdown on a landing strip guided by an instrument landing system ILS. The purpose of the guidance is to cause the aircraft to approach the touchdown point along an accurately controlled glide path in a manner well known per se. This guidance function could also be performed by an MLS system or by a ground controlled approach system, which is shown in FIG. 1 as an alternative and marked GCA. On the ground substantially at touchdown there are multiple reflectors comprising dihedral reflectors having a vertical aperture, for example, of one meter and a horizontal aperture of one to several meters. As pointed out above in the specification, because of the gain of the surface reflectors which a one meter aperture provides, a reflection surface having a large equivalent cross-section which is easily identified is provided. FIG. 1 shows at least two such reflectors which are mutually spaced apart by a small distance d by which coding of their reflections is achieved to uniquely identify their echoes as the aircraft approaches. The distance d can be no smaller than the separation required to produce separate pulses at the weather radar in the aircraft, and this depends upon the resolution as determined by the pulse length of the radar. A pulse of 0.5 microsecond requires the minimum resolution separation to be more than 250 feet. More than two such reflectors are of course possible in order to provide enhanced coding. The separation of a third reflector would also be a distance greater than 250 feet. The reflectors are labelled 10, 11 and 12 in FIG. 1, and each comprises two flat surfaces joined together at a 90° angle to form a dihedral corner reflector.

Figure 3:
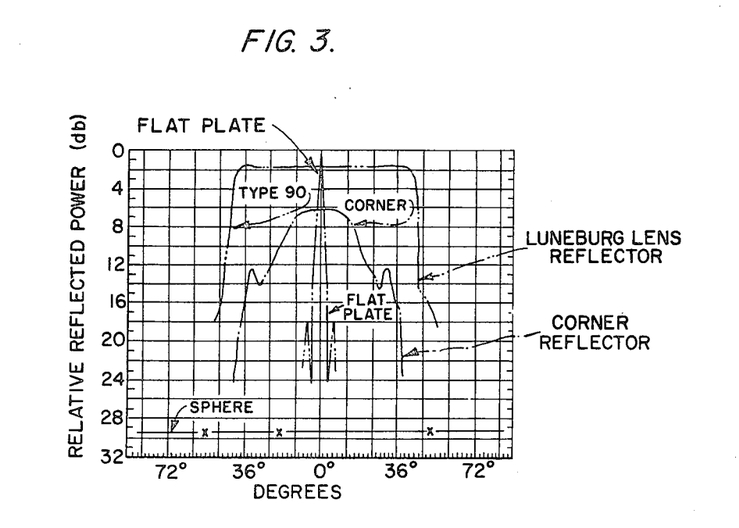
FIG. 3 is a graphical representation showing reflective characteristics for various types of passive reflectors.

As pointed out above, multipath reflections are a very serious and damaging phenomenon when radar-viewing reflectors near the ground. An important feature of the present invention is that the reflectors 10, 11 and 12 are inclined from the vertical somewhat at angles such as the angles A and B shown in FIG. 1. Suitable dihedral reflectors which use plates that provide apertures one meter high by two meters wide will have a vertical beam width of ±1.2°, a typical lobe L for such a reflector being shown in FIG. 1. FIG. 3 provides data for the reflectivity pattern of various types of twelve inch reflectors, including a flat plate reflector. The vertical pattern of a dihedral reflector of one meter in the vertical plane can be deduced from the flat plate data of FIG. 3. This lobe must closely approach the ground to provide coverage for aircraft flying the vertical ILS guidance path, of a nominal 3°, but must be sufficiently attenuated at the ground so that ground reflections will be reduced in signal strength by at least 10 db, whereby they do not contribute significantly to the return signal received but the weather radar in the aircraft. The height of the reflector plates determines the narrowness of their pattern as measured vertically, and once this is determined the width of the reflectors can be used to set their overall reflectivity area. The glideslope path of the aircraft is nominally 3°, and the lobe L should therefore just miss the ground at its lower portion as shown in the figure.

Obviously the reflectors 10, 11 and 12 cannot be placed in the center of the runway, and therefore must be offset to one side. In order to compensate for this offset, the reflectors are turned slightly toward the center of the runway. In addition, they also provide a relatively wide reflection pattern as viewed in a horizontal plane due to the dihedral corner-reflector configuration thereof, as is well known in the prior art.

The airborne weather radar comprises an antenna 14 coupled by a T/R 16 to a transmitter 18 and a radar receiver 20. The receiver 20 delivers pulse signals for each reflection to a decoder 22 which recognizes the encoding spacings of the reflectors on the ground and delivers an output signal on wire 23 when the spacings are such as to indicate recognition of these particular coded calibration reflectors, which are then used to calibrate the radar in a manner to be hereinafter explained. The receiver 20 in most weather radars is of the logarithmic type, and delivers output pulses to a range tracker 24 and to an output wire 25, these pulses being analog in nature. A range gate in the tracker 24 can be used to select a distance-to-target range within which pulses will be passed to the wire 27, which serves the purpose of enabling calibration as hereinafter stated. The range to these encoded reflectors can either be measured by information from the radar itself, or alternatively an airborne DME 26 can operate the range gate tracker 24, whichever is more desirable in a particular instance. In any event, outputs on both wires 23 and 27 provide signals which indicate that these targets 10, 11 and 12 have been identified by their encodement and range, and can further enable the system when they are at a predetermined range from the aircraft, at which range the signals are used to achieve calibration in a manner to be hereinafter discussed.

Signals on wire 25 represent the analog outputs of the receiver 20 appearing as voltage pulses. If the system is to use an analog signal processor, the signals require no conversion, but in a system which uses a digital microprocessor represented by the reference character 30, an analog to digital converter 28 is provided to convert the receiver signals into digital form representing their amplitudes. Whether they are digital or analog signals, the signals appearing on wire 29 will of course vary in magnitude with range, so that the signal echo from a point target of given equivalent radar cross-section will appear to shrink as the range to it increases and vice versa. This effect is overcome in accordance with the radar response by introducing a correction factor based on range to the 4th power, that references the changing range to a normalization range. $R_c$ for point targets the range to a target being represented by the letter $R_c$. The purpose of the present discussion is to provide a correction of the magnitude of a target, of known equivalent radar cross-section at one known range, in such a way that the intensity of the return from the same target at any other range will be made equal in apparent magnitude so that target intensity does not vary with range. This is done by applying the aforesaid correction comprising a function (f) of range to the 4th power. Such a 4th power correction is easily done in the box 34 of the microprocessor 30 in FIG. 1 by correcting the intensity of the echo signal by the following equation.

Correction in db = $10 \log (R/R_c)^4$

Figure 4:
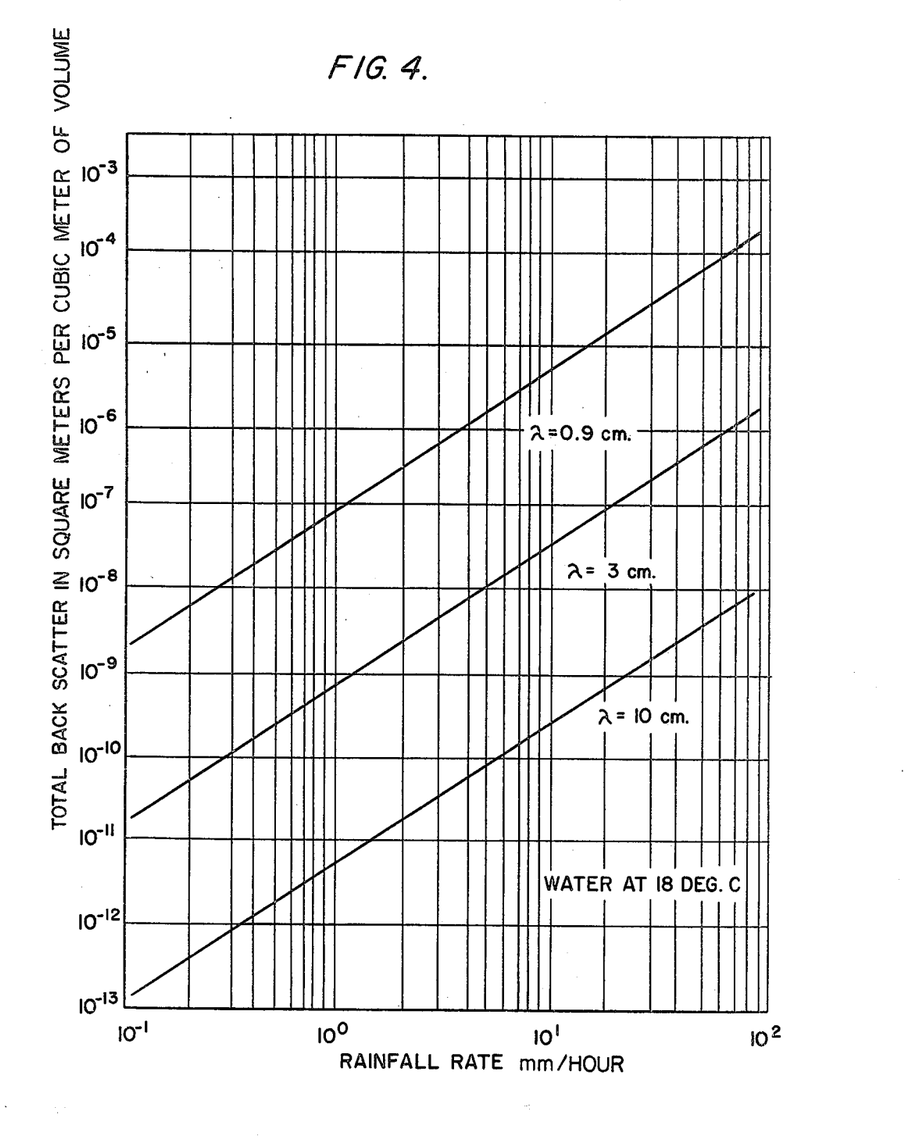
FIG. 4 is a graphical representation of back-scatter reflectivity of rain for different rainfall rates.

The output therefore on wire 32 is a signal representing a target wherein the intensity of the signal is corrected for range so that the magnitude of the echo will appear constant at different ranges. However rain is a distributed target in the sense that a volume of rain generating an echo for the radar will extend in depth over the radar pulse length and in vertical and horizontal extent over the entire beam width of the radar. What is to be determined when the target comprises distributed precipitation, is the radar cross-section per unit volume related to rainfall rate in accordance with the data of FIG. 4, or similar meteorological information. It is thus necessary to correct the signal return from such distributed precipitation by a function ($f_2$) so that the display will represent the volume rate of the precipitation producing the echo. This is done by taking the output of the correction means 34, on wire 32 and dividing it by the pulse volume in the converting means 36 to obtain the distributed precipitation radar cross-section for unit volume. The pulse volume in cubic meters is given by:

$V = \pi R^2 \theta \phi h,$ where
$\theta$ = horizontal beam width (radians)

φ = vertical beam width (radians)
h = pulse length in meters
This converts the signal on wire 32 by a term:

$$\text{Correction (in db)} = k10 \log (R_c/R)^2,$$

where k is a constant determined by the beamwidths and pulse length of the radar whose parameters are easily measured and stable over long periods of time, and hence are not sources of error.

With these corrections made, it remains to calibrate the over-all radar performance. The microprocessor performs the actual function of calibrating the intensity of the signal output of the receiver 20 for a particular viewed radar reflector of known cross-section. The sensitivity response curve of the receiver is of course determined by its circuitry. Therefore, the calibration of the weather radar can be achieved merely by changing the gain of the receiver, which causes raising and lowering of the over-all response curve of the receiver. On a practical basis calibration can be achieved by selecting one predetermined aircraft approach range and the radar point target size with which to accomplish this calibration. The reflector radar cross-section can either be the same for all airports, or different and so noted in the appropriate navigational data such as an approach plate. Finally, it can be permanently stored in the microprocessor memory for each airport. In the manual case, it would be inserted by the operator on approach to a particular airport. A good selection for a calibration range might be, for example, two miles from the reflectors 10, 11 and 12 on the glideslope selected. In this case the range tracker 24 will put out a signal on wire 27 at two miles. When this signal coincides with recognition of coded reflections from the reflectors 10, 11 and 12, a calibration step is performed by the calibrator 38. For instance, the digital level of the signal on the wire 29 is sampled, averaged and held by the calibrator 38 to produce a signal level which should correspond with a certain reference voltage representing the analog pulse signal appearing on wire 25 as determined by the manufacturer for a reflection from a target of given equivalent radar cross-section and at a range of two miles. In analog terms, for instance, the output pulse from the receiver might be 4 volts for a reflection from the ground reflectors 10, 11 and 12 at a two mile range. The output from the decoder on wire 23 indicating recognition of the coded ground reflectors should correspond in arrival time with a digital signal on the wire 29 going to the calibrator 38. It is therefore true that when a two mile indication appears on the wire 27, the sampled and averaged magnitude of the signal on the wire 29 should be four volts. If it is not, the microprocessor calibrator 38 delivers an error signal on the wire 33 which alters the gain of the receiver 20 until the signal on the wire 29 does correspond with a 4 volt analog signal. Calibration can also be done as points along a continuous range. Calibration on a continuous range basis calibrates the receiver over its whole dynamic range. As a practical matter modern logarithmic receivers generate an output that is a linear and stable output of the signal intensity input in db, and hence a single point calibration is generally adequate. However continuous calibration can be used to eliminate the possible miscalibration which would be caused by a large aircraft taxiing by one of the reflectors at just the wrong moment.

The output display 40 is of the PPI type and has an input received through a switch 42 which can be switched either to display signals representing radar cross section of targets from wire 32, or can be switched to wire 37 to display signals representing rainfall rate. The changing of the switch 42 can be done manually, or else it can be done automatically by a suitable output from the calibrator 38 as represented by the dashed line 35 to the switch. Calibration can always be had when the radar is in either the "radar cross section" display mode or in the "rainfall" mode, since echoes taken from the receiver 20 representing the targets 10, 11 and 12 on which calibration is based are not affected by the mode of the display.

Although the diagram of FIG. 1 illustrates an embodiment in which calibration is automatically achieved when the calibrator 38 receives both an indication that recognized coded targets are being observed as indicated by an output on wire 23, and an indication on wire 24 that these reflectors are at a two mile range, a somewhat simpler system could be calibrated by hand using the same targets shown on the ground in FIG. 1, provided adequately controlled approach of the aircraft toward the target occurs so that the aircraft is properly located along the glideslope aiming at touchdown where the targets are located. One possibility would be to have the operator of the radar calibrate its output manually using a control 21 as shown in FIG. 1 to the desired analog or digital voltage level when the two mile range is reached and when the reflectors are recognized by the decoder 22. Other embodiments are of course possible within the scope of the present invention.

Where several reflectors are used, for instance the reflectors 10 and 11 of FIG. 1, they may be angled at slightly different angles A and B, both of which will cause the lobes L' and L" of the two reflectors to lie above the ground plane, but the angles A and B being slightly different so that the lower portion of the lobe from the reflector 11 will partly overlap the upper portion of the lobe from reflector 10, the degree of overlap being carefully adjusted so as to provide echo responses of constant intensity to the aircraft arriving along a glidepath which bisects the zone of overlap of the 2 lobes. In this way, the over-all sum of the composite lobes will be more constant in the vertical, thereby broadening the satisfactory range of approach glide path slopes over which the aircraft can successfully use the reflectors 10 and 11 for calibration purposes.

THE METHOD

The method of the present invention is based upon cooperation between, on the one hand existing guidance approach means, such as ILS systems, MLS systems or even GCA systems which aim the aircraft at the touchdown point and bring it toward that point along an established glidepath, and on the other hand calibrating means in the weather radar cooperating with special calibration reflectors placed on the runway substantially at touchdown.

Figure 2:
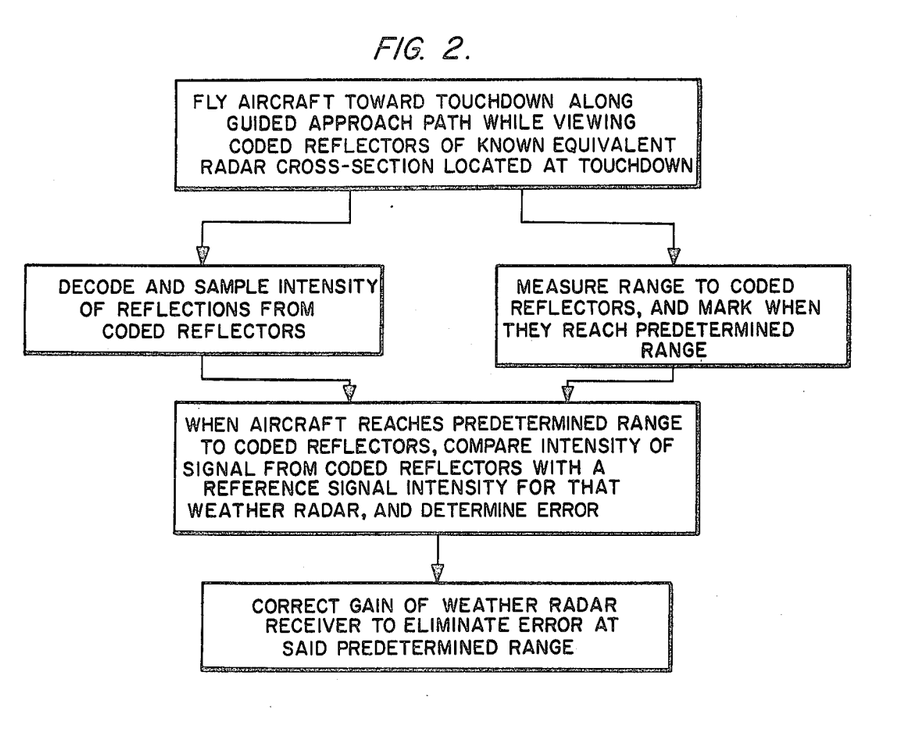
FIG. 2 is a block diagram showing the steps in the weather radar calibration method according to the present invention.

As can be seen in FIG. 2, the aircraft is flown toward touchdown along a guided approach path while it interrogates the coded calibration reflectors located on the runway substantially at touchdown, the radar transmitting pulses to the reflectors and receiving back reflections which are free of multipath signals because of the upward tilt of the reflectors away from the plane of the earth.

The next step is to receive and decode reflections whereby the reflections emanating from the calibration reflectors at touchdown can be separately distinguished from ground clutter signals, and can be isolated in the weather radar from general clutter signals. The calibration reflectors are of course so designed that their reflection signals are very intense as compared with reflections from other ground targets, and the reflectors are so placed on the ground that they are relatively free of nearby large-area non-coded targets.

At the same time, range is measured to the calibration reflectors either using the weather radar itself, or alternatively by measuring range to touchdown using standard DME units found on substantially all aircraft. Thus, both the intensity and coding of reflections from the calibration reflectors, and the range to those reflectors are being continuously monitored.

When the aforesaid predetermined range has been reached, the intensity of the reflections from the calibration reflectors is sampled, averaged and held as shown in the box in FIG. 1, and the microprocessor then compares the intensity of these signals from the calibration reflectors with a standard reference intensity level established by the manufacturer of that weather radar, thereby to develop an indication of any error between these signal intensities.

Either an indication of the magnitude of error can be displayed to the weather radar operator, and the operator can then change a control on the weather radar receiver to alter its gain so as to eliminate the error; or else an automatic adjustment can be made in the gain of the weather radar receiver in such a sense as to eliminate the error and cause the actual measured signal at that range to equal the established standard reference level, such calibration being performed virtually instantaneously while the aircraft is still at said predetermined range. Other means for making this adjustment, aside from altering receiver gain, are of course possible, but this is a convenient parameter to vary.

The design of the radar itself establishes a sensitivity curve having the proper contour, and therefore correction of the gain of the weather radar merely moves the entire sensitivity contour up or down until it is at a correct level for that particular range, at which time it is assumed that the sensitivity of the receiver to targets at other ranges will also be correct.

In a more sophisticated approach, it is possible to correct the gain of the receiver for a series of different ranges by making corrections at multiple different points along the sensitivity curve of the receiver, whereby the contour of the curve itself is re-established for each series of calibration points as measured by an aircraft approaching touchdown as it passes different predetermined ranges from the touchdown point. The other changes and corrections performed in the boxes 34 and 36 in FIG. 1 require no periodic calibration.

The present invention is not to be limited to the exact forms shown and described with respect to the drawings, for obviously changes may be made therein within the scope of the following claims.

I claim:

1. An in-flight calibration system for calibrating an aircraft weather radar while the aircraft is approaching touchdown on a runway along a fixed glideslope path, the system including the combination of:
   (a) approach guidance means cooperatively located in the aircraft and on the ground for guiding the approach of the aircraft toward touchdown along said fixed glideslope path;
   (b) encoded radar reflector means mounted on the ground substantially at touchdown and directed upwardly along said glideslope path, the reflector means having a fixed and predetermined equivalent radar cross-section as viewed along said path and having a reflective pattern aimed upwardly along the path and with a cutoff approaching but above the plane of the runway;
   (c) the aircraft weather radar having an antenna and a transmitter and a receiver and means to adjust the radar sensitivity;
   (d) a decoder coupled to said receiver and operative to deliver signals responsive to decoded reflections from said coded reflector means;
   (e) range measuring means for determining the range from the aircraft to the encoded reflector means, and operative to deliver an enabling signal when the range reaches a predetermined value; and
   (f) calibrator means enabled by signals from said decoder and said range measuring means and operative to compare the intensity level of the output from the receiver representing reflections from the coded reflector means with a reference level, whereby to correct the sensitivity of the receiver to make the output level equal the reference level.

2. The system as claimed in claim 1, wherein said reflector means comprise plural directional reflectors spaced apart longitudinally of the runway about touchdown by a separation greater than the minimum resolution capability of the airborne radar.

3. The system as claimed in claim 2 wherein at least two spaced reflectors are used, each having a sharp lobe pattern as viewed in a vertical plane, the lobe of the first reflector having its upper portion partially overlapping the lower portion of the lobe of the second reflector whereby their composite lobe in the vicinity of the overlap provides reflected signals of uniform intensity within the guidance limits of the glideslope path.

4. The system as claimed in claim 1, wherein each of said reflector means is a corner reflector and comprises dihedral plates joined along an edge which is oriented nearly vertically, the height of the plates determining the angular sharpness of their vertical pattern lobe, and said edge being inclined from the vertical so that the lobe is substantially centered along said fixed glideslope path.

5. The system as claimed in claim 1, wherein each of said reflector means is a Luneburg reflector.

6. The system as claimed in claim 1, wherein the encoded reflector means are located at touchdown, and the range measuring means comprising means for measuring the range to touchdown in order to determine the range to the encoded reflector means.

7. The system as claimed in claim 1, wherein the calibrator further includes means for averaging the intensities of successive outputs from the receiver representing reflections from the coded reflector means, whereby to eliminate echo intensities substantially above or below average received intensities.

8. The system as claimed in claim 1, wherein said calibrator comprises a microprocessor; and wherein the inputs to the microprocessor comprise the output of the receiver representing the intensity of the reflections from the encoded reflector means, the signals from the decoder and the enabling signal from the range measuring means.

9. The system as claimed in claim 8, wherein the weather radar includes a display and wherein said microprocessor further includes correcting means operative to receive the output of the receiver and to correct the level of its intensity by a factor proportional to the fourth power of the change in range to a target of fixed radar cross section whereby the apparent intensity of the target appearing on the display remains constant with changes in range.

10. The system as claimed in claim 9, wherein said microprocessor further includes signal converting means operative to correct the intensity of an output from the receiver, whereby the apparent intensity of precipitation of fixed rate appearing on the display remain constant with changes in range.

11. The method of calibrating a weather radar in an in-flight aircraft while approaching touchdown on a runway having at least one uniquely identifiable reflector of known equivalent radar cross-section, the aircraft having range measuring means, the method comprising:
(a) flying the aircraft along a fixed glideslope path approaching touchdown while illuminating the reflectors with the weather radar output and receiving reflections therefrom, and while measuring range thereto;
(b) sampling the intensities of reflections from the reflectors;
(c) determining when the aircraft is at a predetermined range along the glidepath from the reflectors;
(d) when the predetermined range is reached, comparing the sampled intensities with a reference signal intensity to determine the difference therebetween; and
(e) correcting the sensitivity of the radar to eliminate the difference determined in step (d).

12. The method as claimed in claim 11, including the step of averaging adjacent sampled intensities in step (b) and comparing in step (d) the averaged intensities with said reference intensity.

13. The method as claimed in claim 11, wherein the reflectors are encoded, and reflections received at the radar are decoded to identify the reflections which have their intensities sampled in step (b).

* * * * *